United States Patent [19]

Beckerle

[11] 4,446,542

[45] May 1, 1984

[54] OCEANOGRAPHIC MEASUREMENT SYSTEM

[76] Inventor: John C. Beckerle, 38 Two Ponds Rd., Falmouth, Mass. 02540

[21] Appl. No.: 334,071

[22] Filed: Dec. 23, 1981

[51] Int. Cl.³ ..................... G01S 15/88; G01S 15/96
[52] U.S. Cl. ............................ 367/131; 73/170 A; 367/118; 367/134; 367/117
[58] Field of Search ............ 73/170 A, 579; 367/131, 367/134, 135, 117, 118, 129

[56] References Cited

U.S. PATENT DOCUMENTS 4,114,136  9/1978  D'Albora ..................... 367/131 X
4,308,749  1/1982  Clavelloux et al. ............. 73/170 A

OTHER PUBLICATIONS

Tate, *J. Acous. Soc. Amer.*, vol. 53, No. 3, Mar. 1973, pp. 905-909.

Primary Examiner—Richard A. Farley

[57] ABSTRACT

An acoustic ocean measuring system is disclosed which uses measurements of sound intensity to locate and measure ocean anomalies. Several free-floating sound pulse emitting floats are placed in the ocean area to be measured; the position of the floats can be determined by well-known ranging techniques. Several hydrophones are positioned either in the immediate area or at distant locations to receive the sound pulses. A fixed number of received sound signals are electronically processed to obtain peak intensity signals. A fixed set of peak signals received from the floats over a fixed period of time are used to generate a trend line which can be used to predict the peak intensity received from the position data. The actual received intensity measurements are compared to the predicted measurements; substantial deviations from the predicted values are used to locate and measure parameters of ocean anomalies.

3 Claims, 8 Drawing Figures

OCEANOGRAPHIC MEASUREMENT SYSTEM

FIELD OF APPLICATION

This invention relates to underwater acoustical systems that can locate and delineate ocean anomalies including, but not limited to, mesoscale eddies, thermal fronts, and determine oceanic circulation, measure other physical characteristics of the ocean, and permit assessment of marine life distributions, and ocean bottom resources.

PRIOR ART

It is well-known in oceanographic studies to use an acoustic measuring technique known as the SOFAR technique (Sound Ranging and Fixing). This technique utilizes subsurface neutrally buoyant floats that drift in the ocean and which emit sound signals on regular schedules. The sound signals permit determination of the tracks of the floats (ocean current paths) by acoustic ranging, triangulation and other well-known techniques.

It is also known how to detect slight variations in acoustic travel times of brief pulses of sound, or the signal phase fluctuations of steady or longer sound emissions, tones, or complex tones, in order to permit estimation of variations in sound speed along the multiple sound paths that lace an ocean area, both vertically and horizontally. The fluctuations and variations then permit some parameters of the ocean environment to be determined. This field of study is often referred to as Oceanic Tomography. Recently, there have been attempts to use acoustic time and travel variations to predict the sound speed variation in the ocean between the sound source and the receiver and thereby to detect intervening features such as eddies and thermal currents.

However, there are serious drawbacks to the present art, associated with time of travel measurements such as, the need to have exceedingly accurate, and low-drift time keeping capability in the ocean devices. For example, Rubidium maser clocks are sometimes used for time standards, but these are not only expensive to put on underwater devices, but their power requirements seriously limit the time duration over which measurements may be taken. They are therefore impractical for use in oceanic measurements by surveillance systems that require long in-ocean endurance times.

Additional prior art techniques for locating and measuring ocean anomalies include earth orbiting satellites using infrared sensors and altimeter measurements to obtain sea surface temperature and sea height variations and other oceanic information. These techniques can provide useful information, but there are seasons and places in the ocean where temperature and sea surface height variations are too small to deduce subsurface motions.

Accordingly, it is an object of the invention to provide an oceanographic measurement system which does not require extremely accurate time bases in the surveillance floats.

It is a further object of the invention to provide an ocean surveillance system which is inexpensive and simple.

It is another object of the invention to provide an ocean measurement system which can predict and will permit the determination of the location, movement, extent, and other properties of ocean anomalies from signals received by distant receiver locations.

SUMMARY OF THE INVENTION

The foregoing objects are achieved and the foregoing problems are solved in one illustrative embodiment of the invention which uses the acoustic intensity of the signals emitted from either drifting or moored, or bottom mounted underwater sound sources as recorded at distant receivers in order to obtain measurements that will provide spatial and temporal motion information for the ocean between the sources and receivers.

Specifically, the invention uses novel properties of very intense narrow zones of sound that are produced from a sound source by virtue of the well-known sound channeling properties of the ocean. The location of these zones, called 'caustic regions', depend on the distribution of sound speed in the ocean and on the precise locations of the source or the receiver of sound in depth and geographical location relative to the receiver within the ocean, and, according to the invention, interesting spatial and temporal variations of the ocean located between the source and receivers, can be deduced by measuring the peak intensity of the sound signals received from distant sources. In particular, information can be gathered regarding some recognizable features, such as ocean eddies, internal gravity waves, and tidal oscillations, through which the sound signals pass by monitoring peak sound intensities.

More specifically, a peak signal intensity "trend" line, can be established by performing a series of measurements on float intensity signal peaks over a period of time in the absence of eddies or other ocean anomalies. After a trend line is established the peak signal intensity of a given float as it passes through a caustic zone can be predicted from the trend line once the distance from the receiver to the float is known. Since this distance measurement can be obtained by well-known techniques such as acoustic ranging from the periodic signals emitted from the float, a prediction of the peak signal intensity can be made as the float passes through a caustic zone.

In accordance with the invention, an actual measurement of the peak signal intensity is subsequently made as the float drifts through caustic zones (described in detail below) and this actual measurement is then compared with the predicted value. If the actual value is substantially different from the predicted value, it is an indication that an ocean eddy or other anomaly of interest has intercepted the signal path between the source and receiver. Since several different floats are used with different positions, the size and position of the anomalies can be easily determined by measuring the peak signal intensities received from each float and comparing them to the trend lines pre-established for each float.

In addition, an ocean area may be also illustratively monitored by the many SOFAR floats, acting as instrumented platforms for local sound measurements, (SONEAR). Moored, or bottom mounted instruments and devices in the ocean for transmitting and receiving sounds, or for other measurements, such as temperature, etc. are considered part of the ocean measurements system. Consequently, we herein refer to the over all system by the acronym, THE SONEAR SOFAR SYSTEM.

DETAILED DESCRIPTION

An illustrative embodiment of this invention makes use of the well-known SOFAR acoustic ranging system. This system uses a number of neutrally buoyant floats which are positioned in the ocean area which is to be measured. The floats are constructed in a well-known manner to sink to a predetermined depth and thereafter drift about under the influence of various currents and ocean eddies. The floats contain a self-contained sound source which emits a short tone burst, at a specific frequency, illustratively, 270 Hertz, for 24 seconds, at periodic intervals but not on the same schedule. The floats can be identified by keeping track of the particular time interval in which they emitted their pulse. A short period between emission times is preferred in order to prevent a rapidly drifting float to pass through a narrow caustic zone during the interval when it does not emit a sound pulse. The time duration of the pulses, is chosen to provide enough total signal energy compared to the spectral noise level at the source frequency to insure good detection of the signal, and an accurate determination of the time of arrival at a distant receiver. This choice also effects the duration of the battery supply built into the float sound source. Different source frequencies may be selected to assist in SOFAR float identification, however, intensity at caustics is frequency dependant, and this fact would need to be taken into account.

Figure 1:
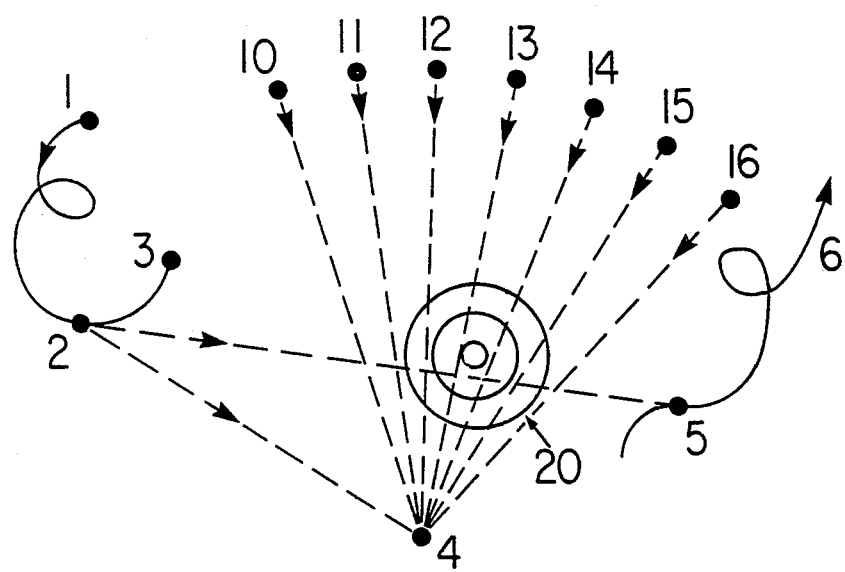
FIG. 1 shows an illustrative deployment of, and position tracks of, sound sources and receivers, with a depiction of the horizontal projection of some sound paths through the ocean (dashed lines with arrows from source to receiver).

FIG. 1 shows a plan view of a typical ocean SOFAR system. An illustrative drifting path of a drifting SOFAR float is shown as positions 1, 2, and 3. The floats are designed to move freely for a number of years and generally contain a sound source which generates short sound bursts at a fixed frequency. An illustrative frequency may be 270 Hertz. At the time of position 2, the float emits a sound signal, one path of the sound goes to receiver device 4 but does not pass through the region of influence of an ocean eddy 20, represented pictorially by the circular rings; and another sound path goes to the receiver device at position 5, but which passes through a portion of the ocean eddy. The receivers at positions 4 and 5 may be drifting floats, or a moored or bottom mounted receivers (hydrophone system), both of which are well-known. In accordance with well-known properties, the sound signals may travel and be detected hundreds of miles away from the sound source due to an effect known as the ocean sound channel. Position 4 (or 5) may also be a terminal point for further signal processing, or may merely relay the data received or some processed portion of it to a terminal point for processing.

Also shown in FIG. 1 is an illustrative deployment configuration which is a preferred configuration. A nearly circular array of sound sources is shown, with position numbers, 10, 11, 12, 13, 14, 15, and 16. These sources may be either moored or air dropped for rapid deployment. If no eddy were present, the signals would arrive at receiver position 4 at the approximately the same time and intensity. However, with the eddy present the sound paths that pass through the eddy shown by dashed lines from source positions 12, 13, 14, and 15, will arrive at different times and with different intensities, because of the focussing or defocussing effects of the ocean eddy anomaly of the sound speed properties of the ocean. Such signals may be conveniently displayed on variable density-time swept instruments, or displayed by other techniques possible with computers.

In accordance with the invention, as will be hereinafter described, peak signal intensity measurements of the sound signals received at receivers 4 and 5 can be used to detect, and localize the position of the ocean eddy. Subsequent changes in the position of the ocean eddy can therefore be easily monitored.

Figure 2:
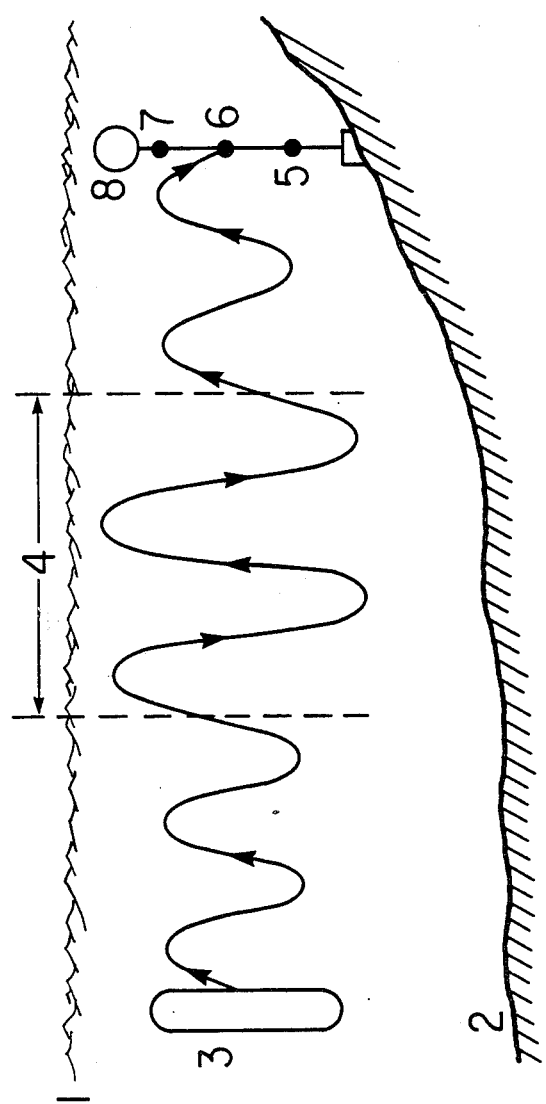
FIG. 2 is a vertical cross-section of the possible deployment of an uninstrumented sound source and several receivers.

FIG. 2 depicts a vertical section through one of the SOFAR floats showing the sea surface 1, the sea bottom 2, and an uninstrumented SOFAR float sound source 3. In accordance with well-known ocean acoustic phenomena, the sound speed in the ocean varies with the depth. This variation at a specific location can be measured experimentally and is known for ocean areas of interest. The sound speed exhibits a minimum at a particular depth under the ocean surface. Due to this minimum, the ocean environment behaves similarly to a waveguide under certain circumstances. The sound rays emitted from a source located at, or near, the minimum sound speed depth propagates in a subsurface sound channel which acts as a "waveguide" for the sound information. The sound energy may travel for hundreds of miles in this channel and still be at detectable levels.

Referring to FIG. 2, assuming source 3 is located near the minimum sound speed depth, a typical sound ray path is shown as a solid oscillating curve. In the absence of an ocean anomaly, the signal level received usually decreases as the distance from the source increases. However, it is known that when a sound signal passes through an ocean anomaly, such as an ocean eddy, such as eddy anomoly region 4, located between dashed vertical lines the sound path and signal amplitude are altered, sometimes drastically in the region of the eddy.

Specifically, after passing through eddy 4, the ray path proceeds to receiver 6 of a subsurface moored vertical array of receivers 5, 6, and 7 with subsurface supporting float 8. Receivers 5, 6 and 7 may illustratively be hydrophones of well-known design which produce an electrical signal whose magnitude is proportional to the magnitude of the received sound signal. Both the arrival time and the intensity of the acoustic signal as recorded by receiver 6 may be altered when the sound path passes through eddy 4.

An array of receivers such as receivers 5, 6, and 7 is preferred because each receiver is responsive to sound signals arriving at slightly different locations. Thus if receiver 6 is not at a signal maximum, receivers 5 or 7 may detect stronger signals. This arrangement allows the signal from float 3 to be reliably detected even though float 3 drifts around under the influence of currents, etc. In particular, sources and receivers located in the same vertical section through the ocean, and at the same geographical location, but at different depths, will intercept the caustic zone regions at different depths. This has an advantage of easily providing many overlapping caustic zone regions in range, because a slight change in source or receiver depth produces a large shift in the horizontal position of the caustic surfaces. This permits in a practical way a dense coverage of the ocean region with caustic zones.

Figure 3:
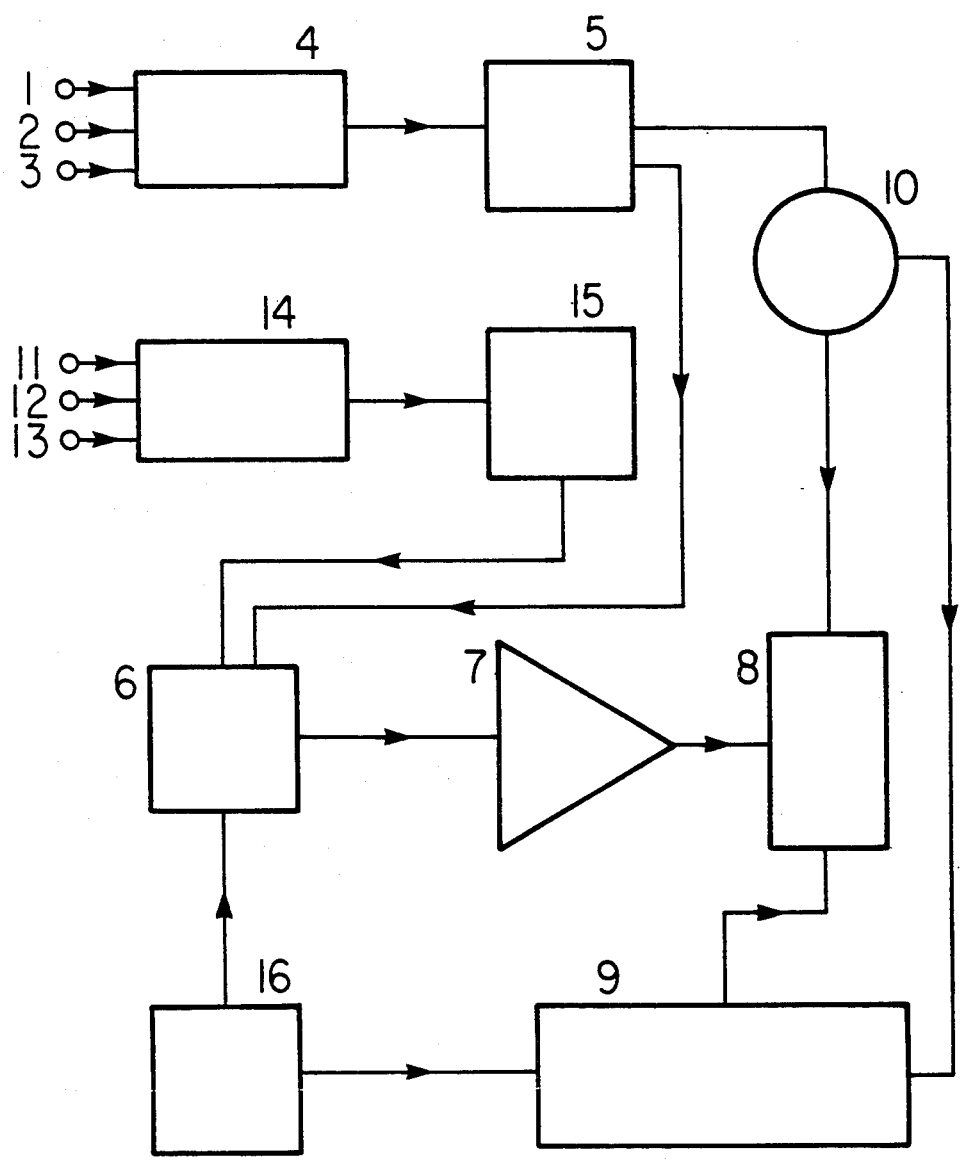
FIG. 3 is a block diagram of basic signal processing to permit intensity variation evaluations.

The signals received at receivers 5, 6 and 7 must first be processed to remove extraneous noise and other unwanted information. The removal of electrical noise from the signal can be accomplished by well-known techniques which form no part of the present invention and will not be discussed in detail herein. FIG. 3 is a simple block diagram illustrating known signal processing techniques and components useful in treating the hydrophone signals. Numbers 1, 2, and 3 represent receivers which may illustratively correspond to receivers 5, 6 and 7 shown in FIG. 2. Also shown are similar receivers 11, 12 and 13 which may be located in a different geographic area. The received signals are provided to the noise filtering and processing circuitry in block 4 and 14. To reduce sound channel noise reception, the signals from the receivers are passed through a band pass filter at the source frequency. The circuitry includes a mixer circuit in which the incoming sound signal is beat against a local oscillator signal at a frequency at or near that of the sound source. The sum and difference frequency of the resulting quadrature signals are passed through a low pass filter centered at the difference frequency. Subsequently, the output signals are digitized, and the digital signals are recorded on a magnetic storage device or other type of storage device shown schematically as blocks 5, 15 and 16. Along with these signals a standard clock signal from clock 10 is also to be recorded for a time reference.

During subsequent processing, the sound signals stored in device 15 (and 5, 16) are sampled at ½ second intervals and passed through squaring device 6, and integrating device 7. The resulting signal provides a measure of the signal intensity or energy. The intensity signals may be provided to a display recorder which may be a variable density recorder or a peak signal level strip chart recorder 8 for direct viewing. The signals for example recorded on storage device 16, may also be provided to a digital computer 9 for further processing in accordance with the invention and for display on display 8.

Figure 4:
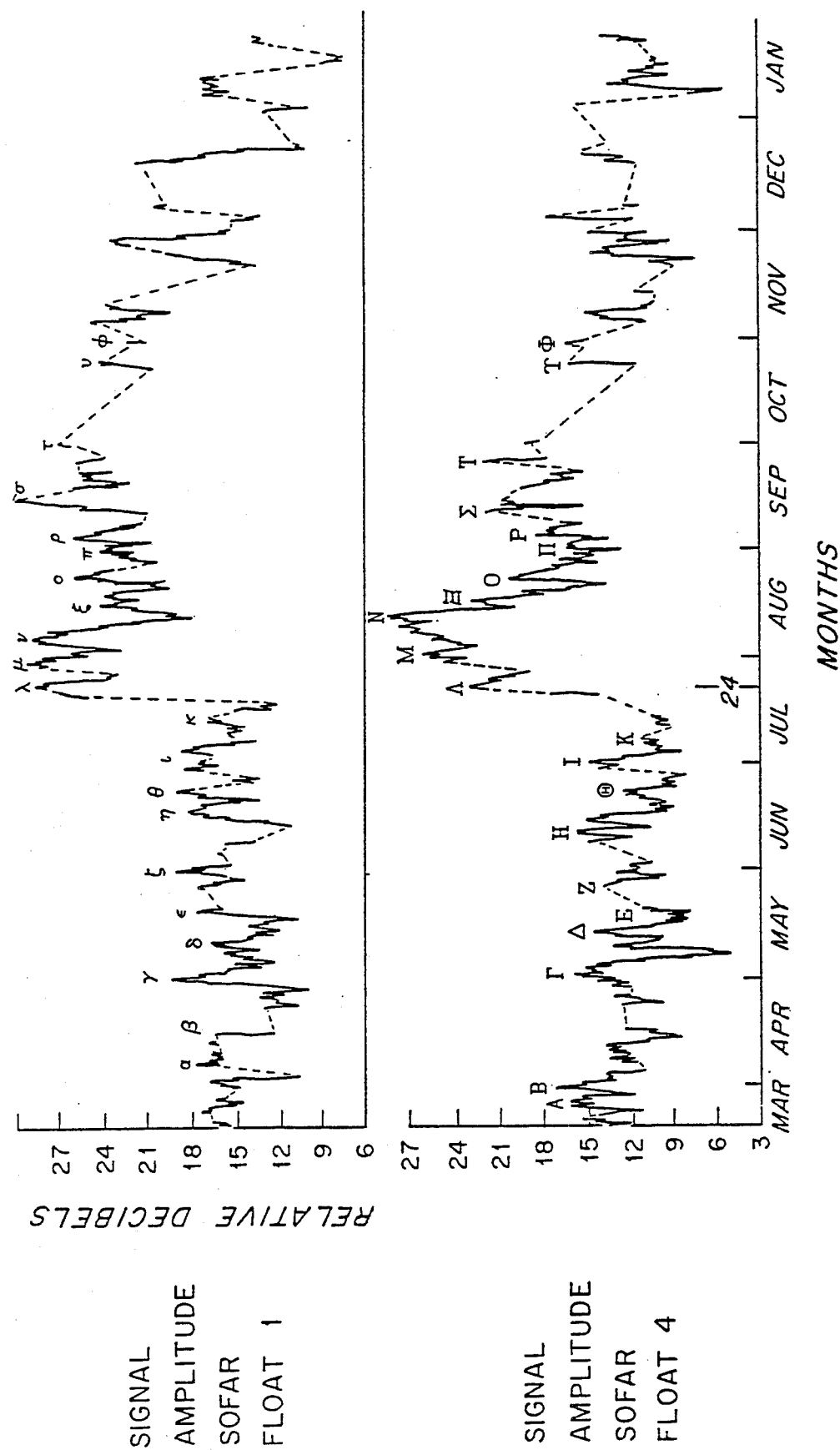
FIG. 4 shows a typical variation with time of intensity of sound signals received from two floats.

FIG. 4 shows a recording of sound intensity signals which may be produced by display device 8 in FIG. 3. The chart shows typical intensity variations (in relative decibels) throughout the months of one year of sound intensity signals received from two SOFAR floats (floats numbered arbitrarily as 1 and 4) arranged as in FIGS. 1 and 2 and floating at a depth of approximately the sound speed minimum. The fluctuations in the signal amplitude are due in part to characteristics of sound propagation in the ocean sound channel (which will be explained in detail below), but, according to the invention, also to the effects of ocean anomalies intersecting the sound path between the source and receiver. In particular the large increase in intensity signal amplitude beginning at day 24 in the month of July is a consequence of the sound paths traversing an oceanic eddy. The significance of the Greek letters will also be explained below.

Figure 5:
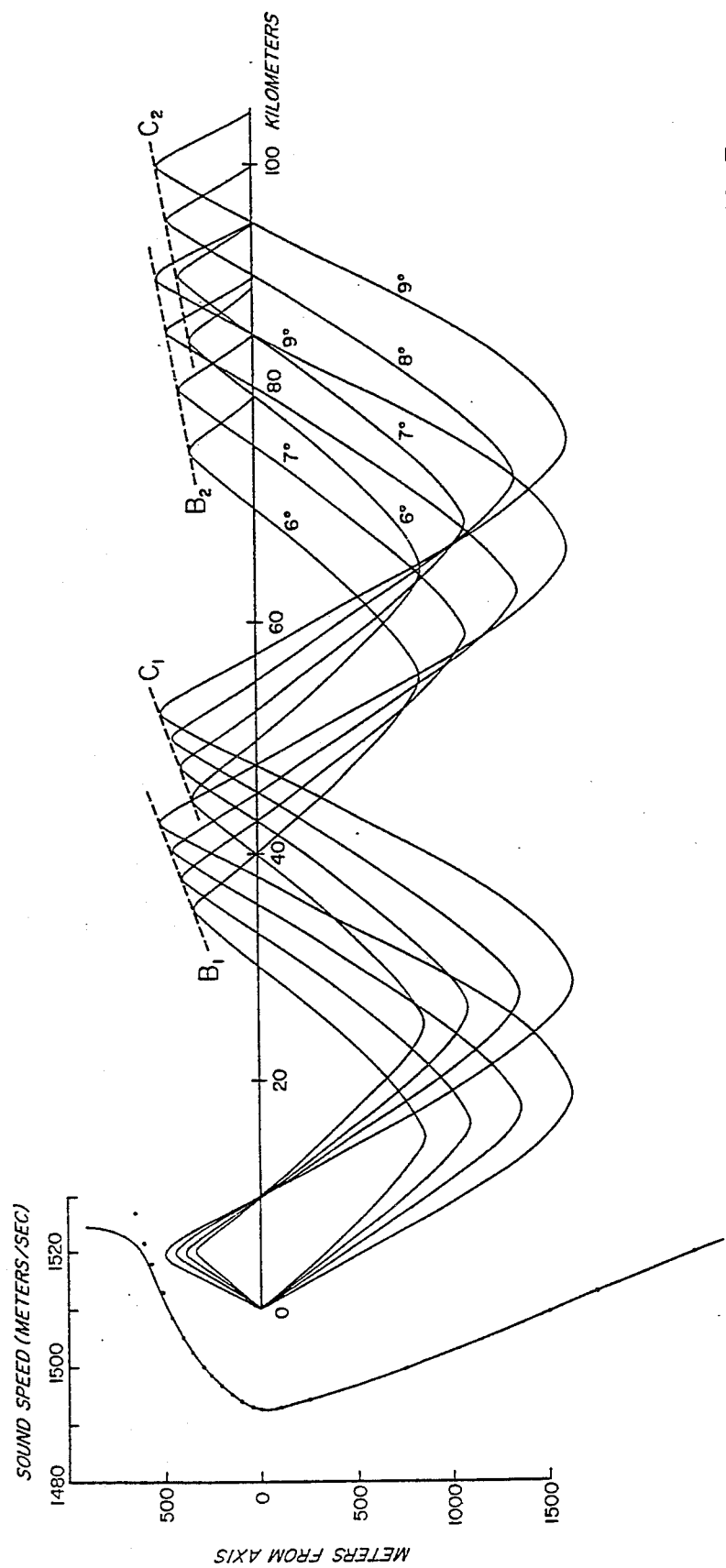
FIG. 5 is a schematic diagram of sound paths through an ocean sound channel illustrating with dashed lines portions of "caustic" zones formed by the sound paths.

Some of the fluctuations in the signal amplitude shown in FIG. 4 are due to sound channel phenomena known as "caustics". In particular, FIG. 5 illustrates a theoretical distribution (in a vertical section of an up and a down facing bundle) of rays of sound paths from a sound source located at the depth of the minimum in sound speed that defines a sound channel axis. This Figure is derived from well-known theory. In addition, a typical sound speed profile with depth is shown at the left side of FIG. 5 which applies when no eddy is present. This profile may be measured according to well-known methods and determines the parameters of the sound channel. The Figure shows the ray paths out to a range of 100 kilometers from the sound source. The Figure is not drawn to scale and, in particular, there is a large vertical exaggeration since the actual angle of the sound rays from the channel axis is on the order of 6–9 degrees.

"Caustic surfaces" are formed by the sound rays where the rays exhibit turning points due to the changes in sound speed. Caustic zones or "caustics" are shown in the Figure above the axis by dashed lines labeled B1, C1, B2, C2, etc. A "doublet" of caustics (B and C) are shown where the "B" caustics are formed from the down-facing cone of rays emanating from the source and the "C" caustics are formed by the upward-facing cone of rays. The numbers next to these letters indicate the "order" number of the caustic zones as shown in distance sequence away from the source (or receiver position). If a hydrophone is located a few hundred meters above the sound channel axis it would intercept the region of the caustic surfaces at regular range intervals. At each caustic zone the sound intensity increases dramatically.

For a fixed hyrophone location and moving floats the amplitude of the received intensity signal could be expected to vary as the float-receiver distance varies and the receiver moves into and out of caustic zones. Such a variation is in fact shown in FIG. 4. However, according to the invention, ocean anomalies also cause variations and the signal changes due to distance fluctuations may be removed by elementary signal processing to leave those variations which are due to the anomalies.

It has been discovered that the existence of an ocean eddy can cause some of the caustic zones to shift in range and change shape. It is this effect that makes the system concept possible in an application to locate ocean eddies.

Figure 6:
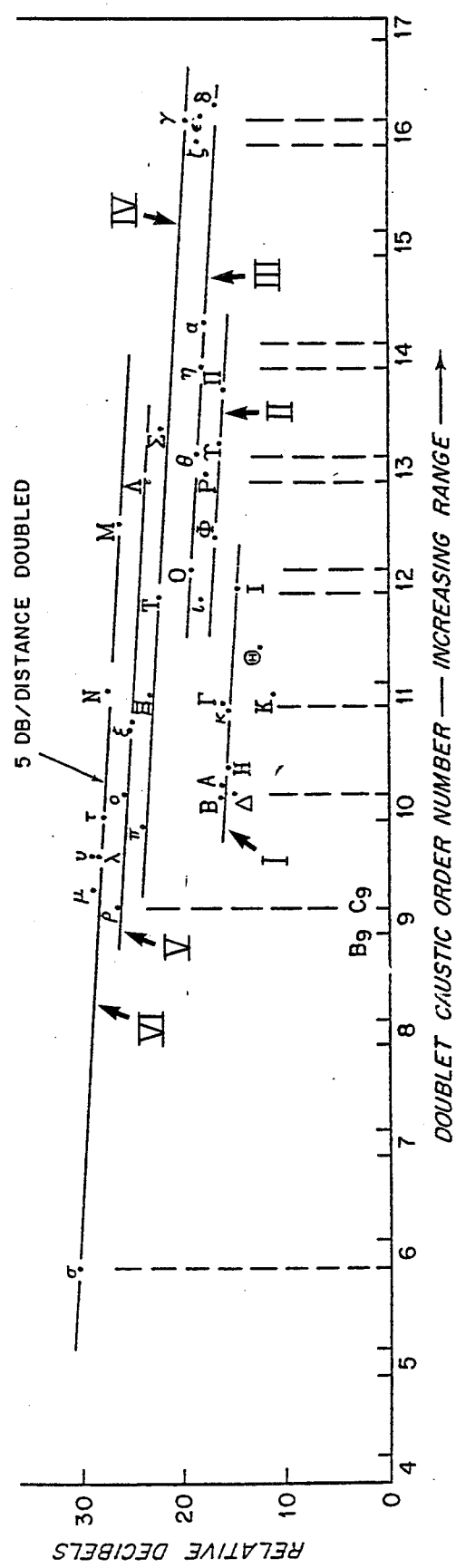
FIG. 6 is a set of trend lines for the signal intensities shown in FIG. 4.

The peaks of the intensity signal levels shown in FIG. 4 can also be plotted in relative decibels as a function of range between the source and receiver given in terms of the doublet caustic order number to produce a number of "trend" lines as shown in FIG. 6. The Greek letters next to the points correspond to signal peaks with the same Greek letter in FIG. 4. The peak signal levels are seen to decrease in a regular fashion with distance along several sets of straight lines that have slope of −5 decibels when the distance is doubled between source and receiver. Moreover, the range position of some of the peaks are between the locations marked for caustic order numbers shown in FIG. 5 and which apply when no ocean eddy is present. This demonstrates that an ocean eddy which was known to be present along the sound transmission path at the time when the points in FIG. 4 were taken can shift the position of the caustic location as well as affect the amplitude of the signal. The peak levels at the caustic zones decrease theoretically with distance at −16.7 decibels for a ten fold change in range between the source and distant receiver. This corresponds to a −5 decibel change on doubling the range. The intensity level at a caustic zone decreases at the same rate with the total distance the source and receiver are displaced from the sound channel axis. Thus, if the sound source is on the axis and the receiver is changed from a 200 meter vertical distance from the axis to 400 meters from the axis, the decrease in caustic intensity level would be 5 decibels. This very simple dependence has been demonstrated herein as very precise and therefore very useful. For example, a source of sound may be distinguished from other sources by the different depths they were set to drift at because they have different sound intensity peak levels in accord with the above tested theoretical result herein disclosed.

The reason for the discrete separation of the sloping trend lines can be attributed to differences in the depth of the two SOFAR floats as measured from the sound channel axis, and to vertical oscillations of the sound speed which alters the depth of a fixed receiver as measured from the sound channel axis. Accordingly, oceanic motion information is present in the intensity fluctuations observable as described that may be extracted according to simple formulas to be presented, and by known intensity computations using ray and wave methods. It is also valuable to have sound speed or temperature sensors at the locations of sources and receivers in the systems.

In particular, in the illustrative system, a peak signal intensity "trend" line, such as lines I, II, III, IV, V, VI, in FIG. 6 can be established by performing a series of measurements on a set of float intensity signal peaks taken over a fixed period of time in the absence of eddies or other ocean anomalies. The trend line can be established by either graphical techniques or by use of simple computer programs which use "least squares" or other well-known techniques to generate the straight line equation which expresses the trend line relation. After a trend line is established by these preliminary measurements, the peak signal intensity of a given float as it passes through a caustic zone can be predicted from the trend line once the distance from the receiver to the float is known. Since this distance measurement can actually be measured by well-known techniques such as acoustic ranging from the periodic signals emitted from the float, a prediction of the peak signal intensity can be made as the float passes through a caustic zone.

In accordance with the invention, a trend line is established by a set of measurements as described above and actual measurements of the peak signal intensity are made as the float drifts through caustic zone. For each measurement, the position of the float at the time the measurement was taken is also obtained. The actual measurements of float position are used in accordance with the established trend lines to generate predicted value of the received signal intensity. The actual received signals are then compared with the predicted values. If the actual values differ substantially from the predicted value, it is an indication that an ocean eddy or other anomaly of interest has intercepted the signal path between the source and receiver. Since several different floats are used with different positions, the size and position of the anomalies can be easily determined by measuring the peak signal intensities received from each float and comparing them to the trend lines pre-established for each float.

It is also possible to estimate a parameter (a) which relates to the percentage change in the sound speed with depth for the section between a source and receiver from intensity observations of sound channel axis caustics because of the simple relationships that hold in the region of the sound channel, and disclosed herein. The parameter (a) is an effective parameter for the channel because it is related to the value (a') that apples above the sound channel axis and to (a") that applies below the axis by the formula:

$(1/a) = (1/a') + (1/a'')$      1.

where $(a) = -(1/c)dc/dz$,      2.

with c the sound speed treated as only a function of depth z. Normally, one measures the sound speed as function of depth and calculates the parameters (a') and (a'') in order to compute the effective parameter (a). However, (a) can be estimated from the intensity of the signals as function of range and depth of the source and receiver along a vertical section in the ocean. This parameter provides information about the characteristics of the sound channel, and permits estimates of intense regions of sound at depths closer to the sea surface.

The relationship between (a) and range (r), is merely $(ar) = K$, where K is a constant,      3.

and between (a) and the combined distances of the source and receiver from the sound channel axis (z) is merely related by $(az) = K''$, another constant      4.

Moreover, a simple relation exists between (a), (r) and (z), namely, $16(az) = (arXar)$. Thus, the caustic intensity, which is proportional to $a^{2/3}/r$      5.

can be expressed as proportional to $a^{5/3}/K$      6.

As a consequence, one may use the signal intensity level measurements from the SOFAR floats in an obvious manner to estimate an average value for the effective parameter (a) along a transmission section. Since (a'') for the region below the sound channel axis does not vary much, one may use an estimated value for (a'') and then use Eq.(1) to calculate an average value for (a'), which is changed more by ocean anomalies and vertical motions of the thermocline. Because of the simplicity of these relationships for sound source and receivers near the sound channel axis, there exists a practical approach to acoustical oceanography using the SONEAR-SOFAR SYSTEM concept.

Figure 7:
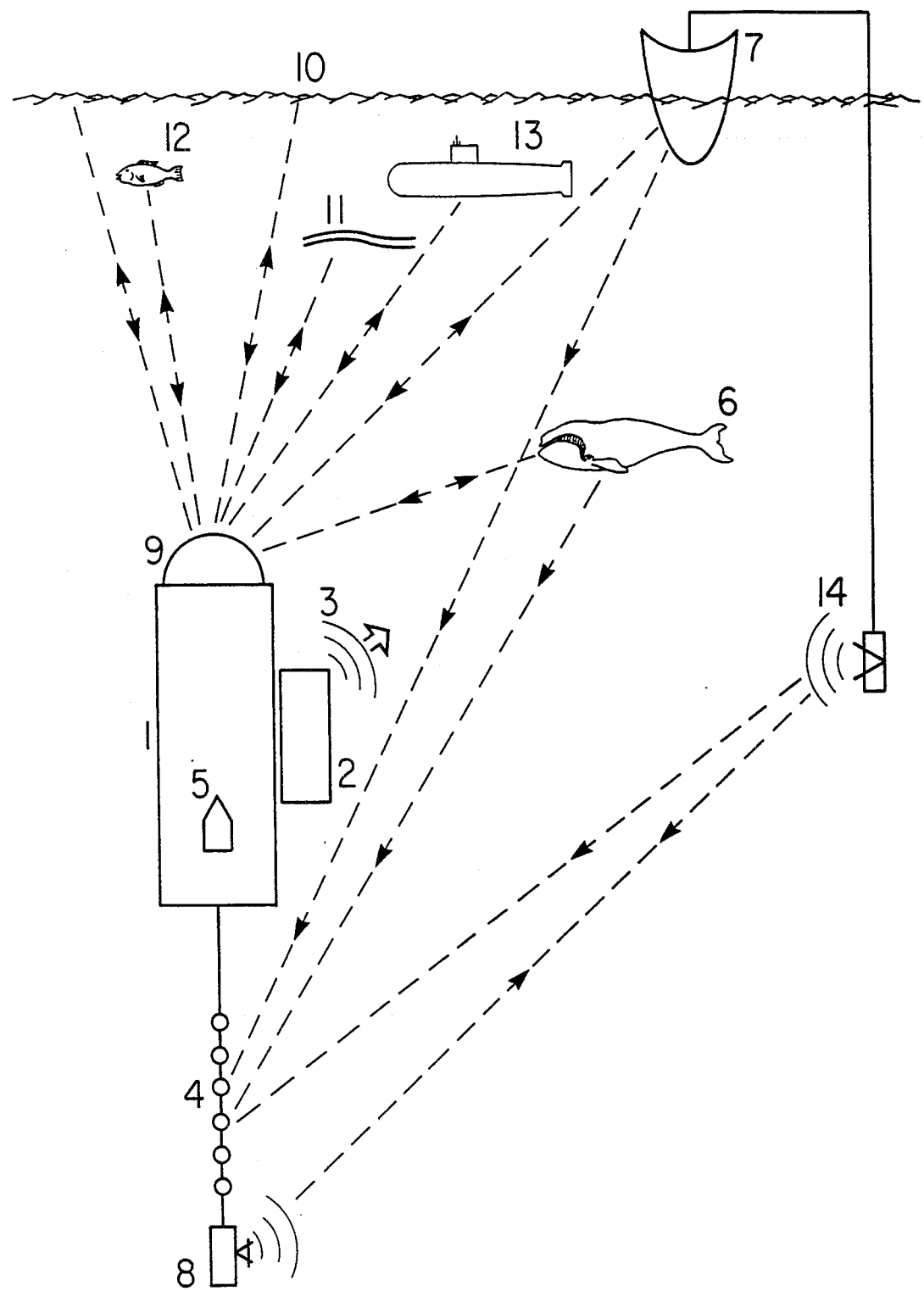
FIG. 7 are specific examples of configurations of sound sources and receivers and other objects to illustrate a few applications of the full system concept.

FIG. 7 depicts an another embodiment of the inventive system. The Figure shows an instrumented SONEAR-SOFAR SYSTEM sound emitting neutrally bouyant float, #1, with SOFAR source #2 transmitting a scheduled acoustic wavefront pulse, #3 to be received by another distant receiver, not shown. A vertical array of hydrophones is depicted suspended from the float as item #4, which records both near and far sounds or echoes from marine life or made noise sources such as whales, #6 and ships, #7, or other undersea vehicles, #13, etc.

Instruments to measure the physical or chemical properties of the ocean are indicated by item #5, and an inverted echo sounder, item #9, can be used to obtain echoes from sea surface waves, shown as item 10, or from the scattering layer, item #11, which is dense with marine life, or from fish to obtain counts and sizes, item #12, and also from undersea vehicles, item #13. The inverted echo sounder also may obtain an accurate measure of the depth of the instrument, and by observing echoes from the bottom of the ocean, not shown, the instrumented float can obtain signals with information about the ocean depth and properties of the ocean sediments and layers beneath. Sound emitting devices mounted on the float such as item 8, as an illustration of the scope of the invention could be controlled to mimic the sounds of marine animals to permit herding of marine life in fisheries applications, or to emit under control the sounds of man made vehicles for the purposes of decoy tactics.

Figure 8:
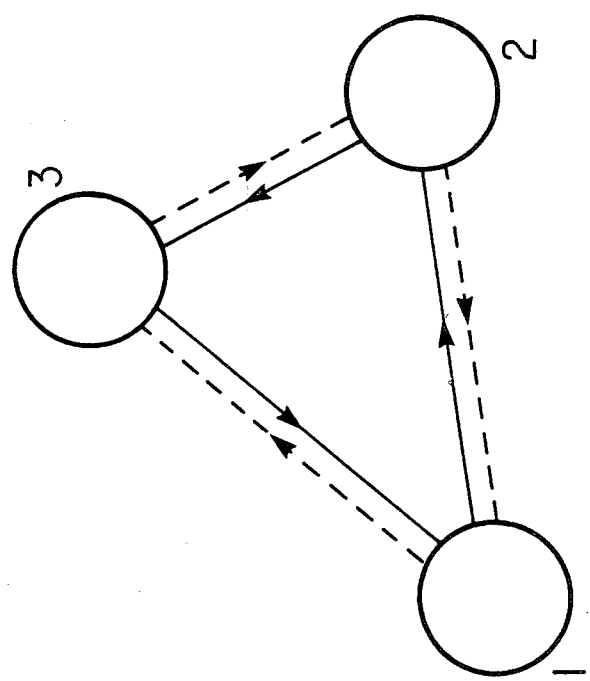
FIG. 8 is a method for obtaining oceanographic information about 'circulation', an important fluid dynamical quantity, that would not be practical without the advantages of the SONEAR-SOFAR SYSTEM as a practical operational system.

FIG. 8 depicts in a geographical view three SO-NEAR-SOFAR SYSTEM floats numbered 1, 2, and 3 which permit acquiring information accoustically about a fluid dynamical quantity known as Circulation. A pulse of sound emitted from source #1 arrives by the solid sound path at receiver in float #2, where it is transponded, with known delay to a receiver on float #3, and again transponded by #3 to arrive at a receiver on float #1. The same pulse emitted by Source #1 proceeds by the same process of transponding the signal received by the other two floats is caused to travel in the reverse direction as indicated by the arrows on the dashed sound paths. Because these two sets of sound paths travel essentially the same sound ray paths, the wave front traveling around the circuit from float #1, to #2, from #2 to #3 and from #3 to #1 may arrive earlier than the signal traveling in the opposite direction around the circuit if an average current circulation exits which carries the wavefront further along its path in the counterclockwise direction; and conversely, the sound wavefront traversing the circuit in the opposite direction will arrive late because the current carried around a closed path, and because the area and the perimeter comprise the sides of the triangle of floats and can be estimated from the measured positions of the SOFAR floats by acoustical triangulation. This scheme becomes a practical method only by virtue of the advantages of an operational SONEAR-SOFAR SYSTEM concept disclosed herein.

Now the ocean contains anomalous regions, such as ocean eddies which move around. These locations cause regions of up moving nutrients, and other oceanic properties of value to the fisheries industry. But, because the eddy can cause a shift in the locations of caustic zones and produce large changes in observed intensities of SOFAR float signals, the SONEAR-SONAR SYSTEM has a unique value. Accordingly, by triangulating on the position of the floats to obtain their position and noting the intensity of the signal it is possible to obtain information about the location, movement, extent, and strength of the ocean eddy or other anomalous features.

Although one illustrative enbodiment of the invention has been shown herein, other embodiments and changes within the spirit and scope of the invention will become obvious to those skilled in the art.

What is claimed is:

1. In an oceanographic measuring system having means located in an ocean area to be measured for emitting sound pulses, an underwater sound receiver, responsive the reception of each of said sound pulses for generating a corresponding electrical signal and means for establishing information indicating the location of said emitting means at the time of the reception of a sound pulse, the improvement comprising, means responsive to said electrical signal for determining the received intensity of the corresponding sound pulse, means responsive to a set of intensity measurements for determining the peak intensity of said sound signals, means responsive to a set of peak intensities taken over a fixed period of time and responsive to corresponding location information for generating a prediction of the peak intensity from said location information, and means responsive to a peak intensity signal corresponding to a sound signal received after said fixed period for comparing said peak intensity signal to a prediction of said peak intensity and for indicating the presence and parameters of an ocean anomaly when said received intensity differs substantially from said predicted peak intensity.

2. A method for detecting and measuring ocean anomalies comprising the steps of;

A. placing a means for emitting sound pulses in an ocean area to be measured,

B. locating an underwater sound receiver at a distance from said emitting means, said receiver being responsive to the reception of each of said sound pulses for generating a corresponding electrical signal, C. generating information indicating the location of said emitting means at the time of the reception of a sound pulse, D. determining the received intensity of an incoming sound pulse, E. determining the peak intensity of said sound signals from a set of intensity measurements, F. generating a prediction of the peak intensity from a set of peak intensities taken over a fixed period of time and corresponding location information, and G. comparing a peak intensity signal corresponding to a sound signal received after said fixed period to a prediction of said peak intensity and indicating the presence and parameters of an ocean anomaly when said received intensity differs substantially from said predicted peak intensity.

3. An oceanographic measurement system comprising a plurality of sound sources located in an ocean area to be measured for emitting sound pulses, at least two underwater sound receivers, each being responsive the reception of each of said sound pulses for generating a corresponding electrical signal, means for establishing information indicating the location of said emitting means at the time of the reception of a sound pulse at each receiver, means responsive to electrical signal from each of said receivers for determining the received intensity of the corresponding sound pulse, means responsive to a set of intensity measurements for determining the peak intensity of said sound signals received at each receiver location, means responsive to a set of peak intensities for each receiver location taken over a fixed period of time and responsive to corresponding location information for generating a prediction of the peak intensity from said location information for each receiver location, and means responsive to a peak intensity signals received at each receiver location corresponding to a sound signal received after said fixed period for comparing said peak intensity signals to predictions of said peak intensity and for indicating the presence and parameters of an ocean anomaly when said received intensity differs substantially from said predicted peak intensity.

* * * * *